(12) United States Patent
Nakai

(10) Patent No.: US 7,554,735 B2
(45) Date of Patent: *Jun. 30, 2009

(54) DIFFRACTIVE OPTICAL ELEMENT AND OPTICAL SYSTEM INCLUDING THE SAME

(75) Inventor: Takehiko Nakai, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/874,046

(22) Filed: Oct. 17, 2007

(65) Prior Publication Data

US 2008/0043335 A1 Feb. 21, 2008

Related U.S. Application Data

(63) Continuation of application No. 11/093,085, filed on Mar. 29, 2005, now Pat. No. 7,301,702, and a continuation of application No. 11/849,971, filed on Sep. 4, 2007.

(30) Foreign Application Priority Data

Apr. 1, 2004 (JP) ............... 2004-109091

(51) Int. Cl.
*G02B 5/18* (2006.01)
(52) U.S. Cl. ..................... 359/576; 359/570
(58) Field of Classification Search ................. 359/570, 359/576
See application file for complete search history.

(56) References Cited

U.S. PATENT DOCUMENTS

| 5,044,706 | A | 9/1991 | Chen |
| 5,790,321 | A | 8/1998 | Goto |
| 6,130,785 | A | 10/2000 | Abe |
| 6,157,488 | A | 12/2000 | Ishii |
| 6,873,463 | B2 | 3/2002 | Nakai |
| 6,829,093 | B1 | 12/2004 | Nakai |
| 7,301,702 | B2 * | 11/2007 | Nakai .................. 359/576 |
| 2002/0036827 | A1 | 3/2002 | Nakai |

FOREIGN PATENT DOCUMENTS

| JP | 09-171097 | 6/1997 |
| JP | 2001-042112 | 2/2001 |

OTHER PUBLICATIONS

George N. Lawrence, "SPIE-International Lens Design Conference" vol. 1354, Jun. 11-14, 1990.

* cited by examiner

*Primary Examiner*—Arnel C Lavarias
(74) *Attorney, Agent, or Firm*—Canon USA Inc IP Div

(57) ABSTRACT

A diffractive optical element includes a plurality of diffraction gratings. A diffraction grating within the plurality of diffraction gratings includes a plurality of grating parts having a curved grating surface and grating tips which connect to define a curved envelope face. The grating surface has a radius of curvature larger than a radius of curvature of the envelope face. In addition, two diffraction gratings within the plurality of diffraction gratings are composed of different materials having different dispersions. Therefore, even when the radius of curvature of the envelope face is small, the degradation of the diffraction efficiency is suppressed.

1 Claim, 9 Drawing Sheets

DIFFRACTIVE OPTICAL ELEMENT AND OPTICAL SYSTEM INCLUDING THE SAME

CROSS-REFERENCE TO RELATED APPLICATIONS

This is a continuation of U.S. application Ser. No. 11/849,971 filed Sep. 4, 2007, which is a continuation of U.S. application Ser. No. 11/093,085 filed Mar. 29, 2005, which claims priority from Japanese Patent Application No. 2004-109091 filed Apr. 1, 2004, all of which are hereby incorporated by reference herein in their entirety.

BACKGROUND OF THE INVENTION

1. Field of the Invention

The present invention relates to diffractive optical elements, and in particular, to a diffractive optical element suitable for use with light having plural wavelengths or bandwidths and to an optical system including such diffractive optical element.

2. Description of the Related Art

In order to reduce chromatic aberration, in addition to a method of utilizing a combination of lenses of different glass materials, a method using a diffractive optical element disposed on a surface of a lens or arranged as part of an optical system is known. This diffractive method is disclosed in, for example, SPIE, vol. 1354, International Lens Design Conference, 1990; Japanese Patent Laid-Open No. 4-213421 (corresponding to U.S. Pat. No. 5,044,706); and Japanese Patent Laid-Open No. 6-324262 (corresponding to U.S. Pat. No. 5,790,321).

This method utilizes a physical phenomenon in which chromatic aberration of a light ray having a reference wavelength at a refractive face is present in a direction opposite to that at a diffractive face in an optical system.

The use of such a diffractive optical element can achieve an effect equal to that realized by an aspherical lens by changing a period of the periodic structure of the diffractive optical element, resulting in a large reduction in aberration.

In refraction, a single ray of light is still a single ray after being refracted. In contrast to this, in diffraction, a single ray is divided into a plurality of diffraction orders after being diffracted. Therefore, in the case of using a diffractive optical element as a lens system, it is necessary to determine the grating structure so that a pencil of light in a used wavelength range is concentrated in a single specific order (hereinafter, referred to also as "design order"). If light rays concentrate in a specific order, the intensity of a diffraction ray of a different order is low. If the intensity is reduced to zero, such a diffraction ray is not present.

Therefore, in order to apply a diffractive optical element to an optical device using broadband light, such as a camera for photographs, the diffraction efficiency of light of a design order must be sufficiently high throughout the used wavelength range.

In the case where a light ray of a diffraction order different from a design order is present, the light ray is imaged at a location different from that for a light ray of the design order and thus results in flare. Accordingly, in an optical system utilizing a diffraction effect, it is important to fully consider the spectral distribution of diffraction efficiency at a design order and the behavior of a light ray of an order different from the design order.

FIG. 14 shows a diffraction grating of a known diffractive optical element. FIG. 15 illustrates the characteristics of diffraction efficiency for a specific diffraction order when the diffractive optical element shown in FIG. 14 is disposed on a certain surface.

In the following description, each value of diffraction efficiency represents the ratio of each diffraction ray to the overall transmitted pencil of light in light quantity, and for the sake of simplicity, the value ignores reflected rays at a grating surface.

In FIG. 15, the horizontal axis of a graph represents wavelength and the vertical axis represents diffraction efficiency. This diffractive optical element is designed such that it exhibits the highest diffraction efficiency in a used wavelength range at the positive first diffraction order, as indicated by a solid line. In other words, the design order is the positive first order.

In FIG. 15, the diffraction efficiency for two diffraction orders around the design order (i.e., zeroth order and positive second order, which are one order lower than and higher than the positive first order, respectively) is also shown.

As shown in FIG. 15, the diffraction efficiency for the design order exhibits the highest value at a certain wavelength (hereinafter, referred to as "design wavelength") and decreases gradually at other wavelengths.

The decrease in diffraction efficiency for the design order leads to diffraction rays of other orders and results in flare.

There exists a known structure capable of reducing the decrease in diffraction efficiency (see Japanese Patent Laid-Open No. 9-127322, corresponding to U.S. Pat. No. 6,157,488). As shown in FIG. 16, in this structure, the two materials of a first diffraction grating 6 and a second diffraction grating 7 and the grating thicknesses, d1 and d2, thereof are optimally selected, and the diffraction gratings 6 and 7 having the same grating pitch are arranged adjacent to each other with an air layer 8 disposed therebetween. Therefore, this structure achieves high diffraction efficiency throughout the visible range, as shown in FIG. 17.

This structure is of a two-layer construction, as shown in FIG. 16, and realizes high diffraction efficiency by optimizing the refractive index and the dispersion of each of the materials of the diffraction gratings 6 and 7 and the grating thicknesses d1 and d2.

Japanese Patent Laid-Open No. 9-127322, which describes the known structure described above, merely discloses that a plane produced by connecting the tips of the grating part is flat and does not mention a specific shape of a diffraction grating disposed on a curved surface.

There are known structures of a diffractive optical element in which a plurality of diffraction gratings disposed on curved surfaces are layered, the diffractive optical element realizing high diffraction efficiency (see Japanese Patent Laid-Open No. 2001-042112 corresponding to European Patent Application Publication No. 1 072 906 A2, and Japanese Patent Laid-Open No. 2002-107520 corresponding to U.S. Patent Application Publication No. 2002-036827).

FIG. 19 is a cross-sectional view showing a main portion of a diffractive optical element disclosed in Japanese Patent Laid-Open No. 2001-042112.

As shown in FIG. 19, in a diffractive optical element 1, a first diffraction part 2 and a second diffraction part 3 are arranged adjacent to each other with an air layer 8 disposed therebetween. The first diffraction part 2 includes a first substrate 4 and a first diffraction grating 6 disposed on a surface of the first substrate 4. The second diffraction part 3 includes a second substrate 5 and a second diffraction grating 7 disposed on a surface of the second substrate 5. All layers function as the single diffractive optical element 1.

The surfaces, on which the diffraction gratings 6 and 7 are disposed, of the substrates 4 and 5 and the opposite surfaces thereof are both curved surfaces. Each of the substrates 4 and 5 itself functions as a refractive lens. Envelope faces 9 and 10 are curved surfaces defined by connecting the tips of the first diffraction grating 6 and that of the second diffraction grating 7, respectively.

FIG. 20 is a cross-sectional view showing a main portion of a diffractive optical element disclosed in Japanese Patent Laid-Open No. 2002-107520. As shown in FIG. 20, in a diffractive optical element 1, a first diffraction part 2 and a second diffraction part 3 are arranged adjacent to each other with an air layer 8 disposed therebetween. The first diffraction part 2 includes a first substrate 4 and a first diffraction grating 6 disposed on a surface of the first substrate 4. The second diffraction part 3 includes a second substrate 5, a second diffraction grating 7 disposed on a surface of the second substrate 5, and a third diffraction grating 16 disposed on the second diffraction grating 7. All layers function as the single diffractive optical element 1.

A face 10, which is opposite to a grating surface 12, of the third diffraction grating 16, is a curved face that does not include a grating part, and has substantially the same curvature as a face on which a grating part is formed in the second substrate 5. For the substrates 4 and 5, the surfaces on which the diffraction gratings 6 and 7 are disposed and the opposite surfaces are both curved surfaces. Each of the substrates 4 and 5 itself functions as a refractive lens.

These layered diffractive optical elements, in which a plurality of diffraction gratings are arranged on curved faces, are optimized for a certain angle of incidence. Specifically, in the example shown in FIG. 19, the diffractive optical element has a structure optimally adjusted for a case where a pencil of light is incident mainly from the direction normal to the envelope faces 9 and 10 (hereinafter, referred to also as "curved base faces"), which are individual faces defined by connecting the tips of a grating part 6a and a grating part 7a.

Diffractive optical elements applied to various optical systems receive rays incident from various directions, i.e., may receive a pencil of light incident from directions other than the direction normal to an envelope face (curved base face) of a diffraction grating. For example, with a diffractive optical element including a diffraction grating having an envelope face with a small radius of curvature, a pencil of light is incident from various directions.

In this case, an angle from the direction normal to the envelope face to one direction becomes significantly larger with respect to the optical axis. Therefore, in the case where the diffractive optical element is used in an optical system, incident angles are distributed from the direction normal to the envelope face to a direction parallel to the optical axis.

As a result, the structure in which the diffractive optical element is optimized for a pencil of light incident from the direction normal to the envelope face may have low diffraction efficiency.

SUMMARY OF THE INVENTION

The present invention provides a diffractive optical element that minimizes a decrease in diffraction efficiency even when a diffraction grating has an envelope face with a small radius of curvature. The present invention is also directed to an optical system incorporating the diffractive optical element.

According to one aspect of the present invention, there is provided of a diffractive optical element having a plurality of diffraction gratings, including two diffraction gratings, which are composed of different materials having different dispersions. A diffraction grating includes a plurality of grating parts having a curved grating surface and grating tips. The grating tips connect to define a curved envelope face. A radius of curvature of the grating surface is larger than a radius of curvature of the envelope face.

Further features and advantages of the present invention will become apparent from the following description of exemplary embodiments with reference to the attached drawings.

DESCRIPTION OF THE EMBODIMENTS

First Embodiment

Figure 1:
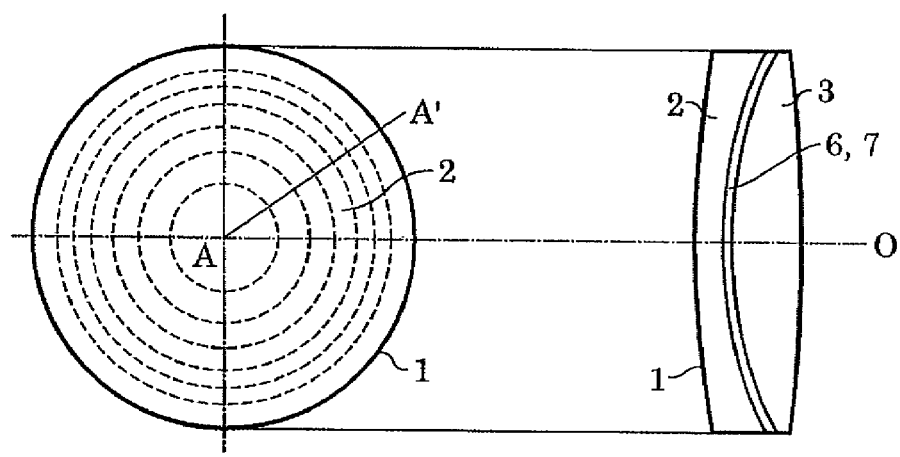
FIG. 1 is plan and side views showing a main portion of a diffractive optical element according to a first embodiment of the present invention.

A diffractive optical element 1 according to a first embodiment of the present invention is described below. FIG. 1 is a schematic view (including a front view and a side view) of the diffractive optical element 1 according to the first embodiment. The diffractive optical element 1 includes a first diffraction part 2 and a second diffraction part 3 disposed adjacent to each other (layered) with a distance D1 therebetween.

In FIG. 1, a first diffraction grating 6 and a second diffraction grating 7 have concentric grating parts and have a lens function (convergent or divergent function). The first diffraction grating 6 and the second diffraction grating 7 are formed on curved faces.

Figure 2:
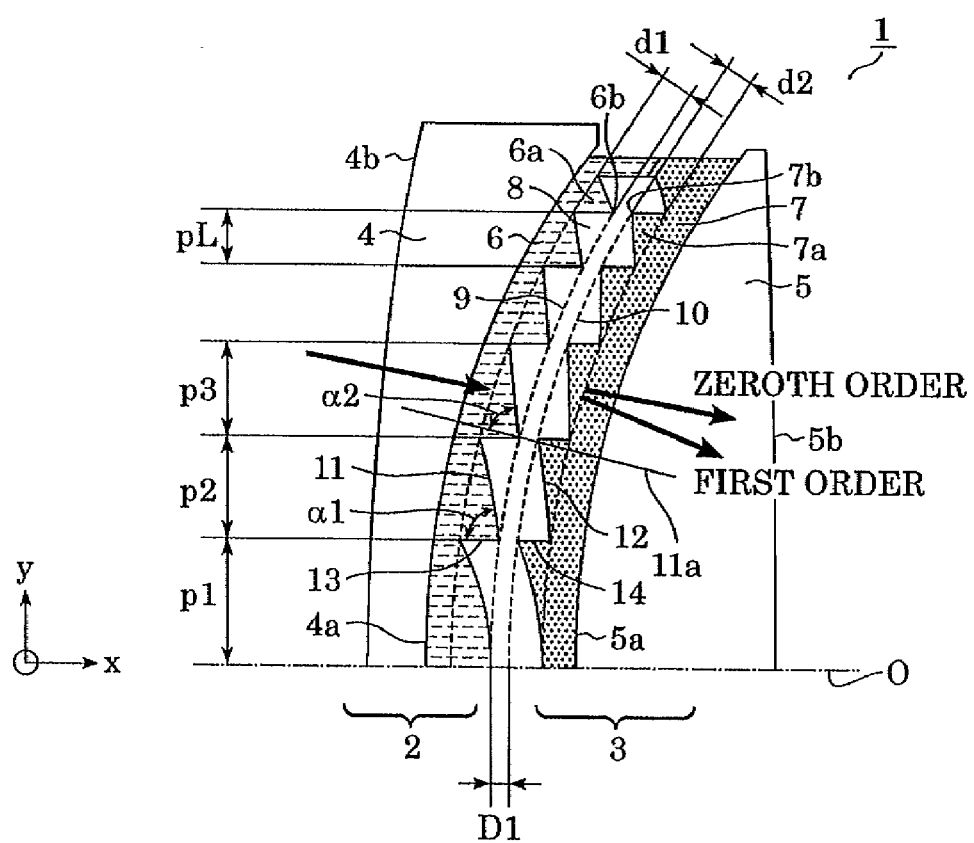
FIG. 2 is a cross-sectional view of a main portion of the diffractive optical element according to the first embodiment.

FIG. 2 partly shows the diffractive optical element 1 in cross section taken along line A-A' of FIG. 1. For the sake of clarity, FIG. 2 is not drawn to scale, especially in the direction of depth of the gratings, and the shown number of the grating part is lower than the actual number.

In cross section, the diffractive optical element 1 has a structure in which the first diffraction part 2, including a first substrate 4 and the first diffraction grating 6 formed on a first curved face 4a of the first substrate 4, is adjacent to the second diffraction part 3, including a second substrate 5 and the second diffraction grating 7 formed on a second curved face 5a of the second substrate 5, with an air layer 8 disposed therebetween, and the distance between the first diffraction part 2 and the second diffraction part 3 is D1.

All layers function as a single diffractive optical element. A first envelope face 9 defined by connecting a tip 6b and other tips of a first grating part (including plural grating components) 6a of the first diffraction grating 6 is a curved face and has substantially the same radius of curvature as that of the first curved face 4a, on which the first diffraction grating 6 is formed, of the first substrate 4.

Similarly, a second envelope face 10 defined by connecting a tip 7b and other tips of a second grating part 7a of the second diffraction grating 7 is also a curved face and has substantially the same radius of curvature as that of the first envelope face 9.

In FIG. 2, the first envelope face 9 is concave, and the second envelope face 10 is convex. The first envelope face 9 is spaced D1 away from the second envelope face 10 along the optical axis.

The radius of curvature R9 of the first envelope face 9 is substantially the same as the radius of curvature R10 of the second envelope face 10, and to be more specific, both radiuses of curvature are such that the center of curvature of the first envelope face 9 is the same as that of the second envelope face 10.

In other words, since the distance between the first envelope face 9 and the second envelope face 10 along the optical axis O is D1, R9=R10+D1.

In FIG. 2, the height (grating thickness) of the first grating part 6a of the first diffraction grating 6 is d1, and the height (thickness) of the second grating part 7a of the second diffraction grating 7 is d2. A projection component of each of the heights d1 and d2 in the direction normal to each of the first envelope face 9 and the second envelope face 10 is constant.

Regarding the diffractive optical power due to diffraction caused by the first diffraction grating 6 and the second diffraction grating 7, that is, the diffractive optical power excluding refractive optical power due to refraction caused by the first envelope face (curved base face) 9 and the second envelope face (curved base face) 10, the first diffraction grating 6 has a positive optical power and the second diffraction grating 7 has a negative optical power.

Figure 3:
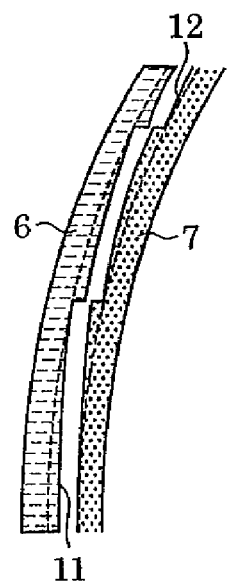
FIG. 3 is an enlarged cross-sectional view of diffraction parts of the diffractive optical element according to the first embodiment.

In FIG. 2, since the grating heights d1 and d2 are not drawn to scale, a first grating surface 11 is represented as a convex shape. In reality, however, the grating height is on the order of about 10 μm, and therefore, the first grating surface 11 of the first diffraction grating 6 actually has a concave shape, as shown in the enlarged view of FIG. 3.

Specifically, since the refractive effect (negative optical power) caused by the concavity of the curved base face 9 is reduced by the positive optical power caused by the diffraction lens (first diffraction grating 6), the first grating surface 11 is of a concave shape having the radius of curvature R11 larger than the radius of curvature R9 of the first envelope face 9 in absolute terms.

Similarly, since the refractive effect (positive optical power) caused by the convexity of the curved base face 10 is reduced by the negative optical power caused by the diffraction lens (second diffraction grating 7), the second grating surface 12 has a convex shape having the radius of curvature R12 larger than the radius of curvature R10 of the second envelope face 10 in absolute terms.

An angle α1 defined between the first grating surface 11 (second grating surface 12) and a first grating side 13 (second grating side 14) is larger than an angle α2 defined between the first grating surface 11 (second grating surface 12) and a normal 11a to the first envelope face 9 (second envelope face 10) defined by connecting the grating tips of the first grating part 6a (second grating part 7a) at a position of one of the grating tips; that is, α1>α2.

Each of the first grating side 13 and the second grating side 14 shown in FIG. 2 is a cylindrical surface substantially parallel to the optical axis O.

Specifically, R9 is about 44.0015 mm and R11 is about 46.7597 mm, and therefore, R9<R11. R10 is about 44 mm and R12 is about 45.7186 mm, and therefore, R10<R12.

The first curved face 4a and an opposite first face 4b in the first substrate 4 and the second curved face 5a and an opposite second face 5b in the second substrate 5 are all curved faces, and each of the substrates 4 and 5 functions as a refractive lens.

The diffraction efficiency of the diffractive optical element 1 is described below.

Figure 14:
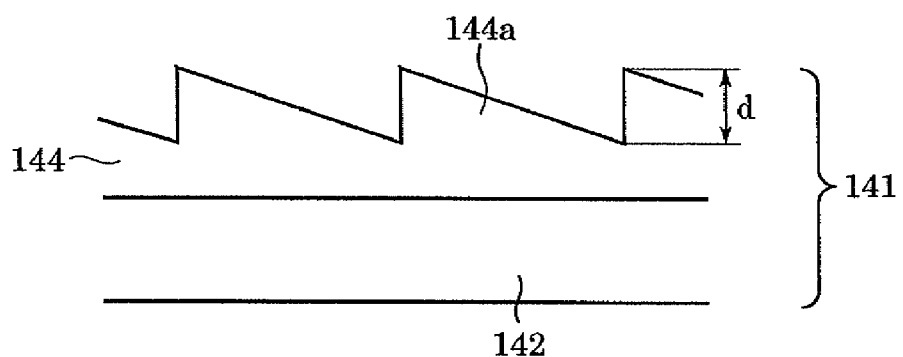
FIG. 14 is an illustration for explaining the shape (triangular waveform in cross section) of a diffraction grating of another known diffractive optical element.
Figure 15:
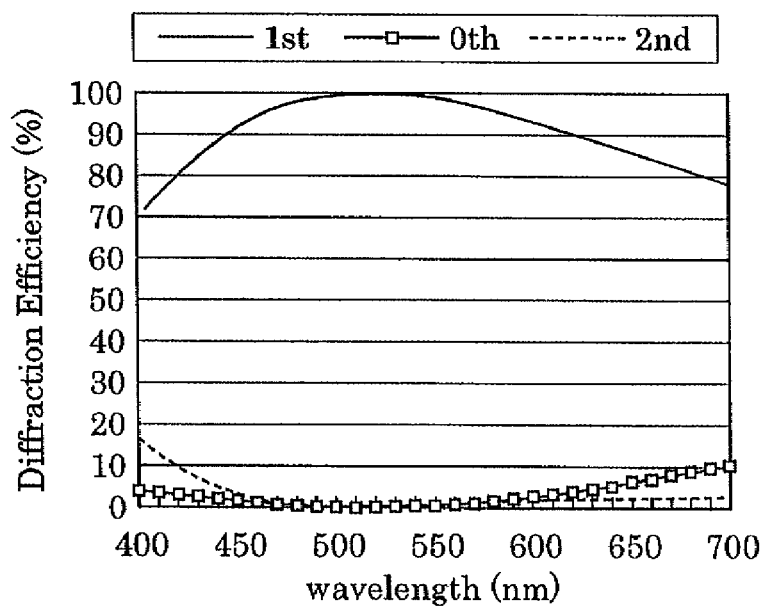
FIG. 15 is a graph of diffraction efficiency of the known diffractive optical element.
Figure 16:
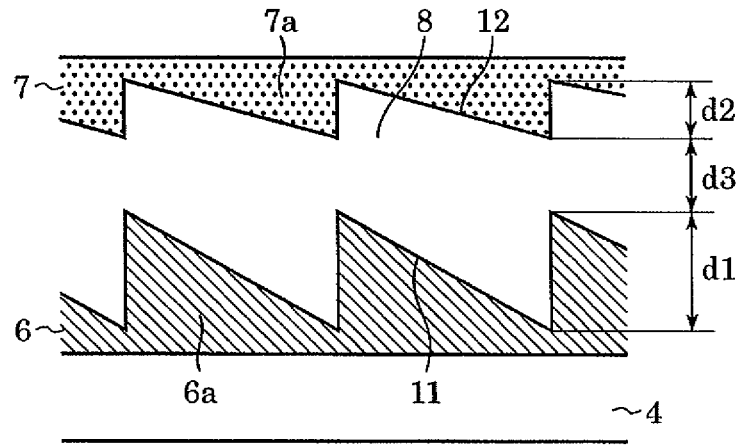
FIG. 16 is a cross-sectional view of another known multilayer diffractive optical element.
Figure 17:
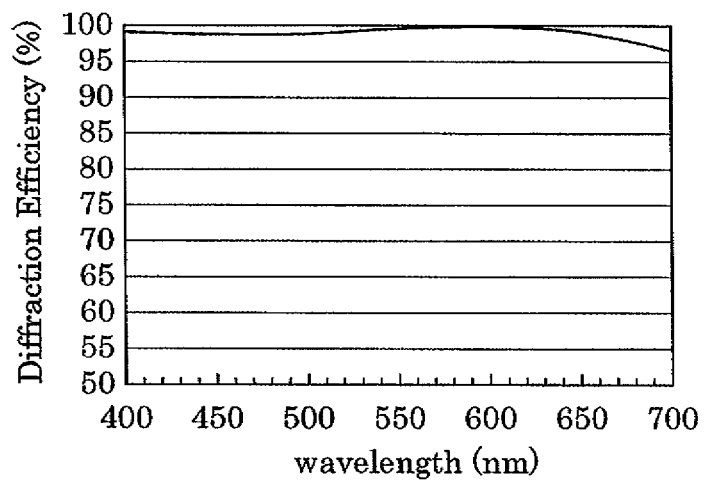
FIG. 17 is a graph of diffraction efficiency of the known multilayer diffractive optical element.

FIG. 14 shows an ordinary single-layer diffractive optical element 141 including a substrate 142 and a transmission grating 144 disposed on the substrate 142. In the diffractive optical element 141, a condition that the diffraction efficiency be largest at a design wavelength λ0 is such that, in the case of a pencil of light incident perpendicular to the grating 144, the difference in the optical path length between a peak and a valley of a grating part 144a is an integral multiple of the wavelength. As a result, the condition is represented by the following equation (1):

$$(n01-1)d = m\lambda 0 \tag{1}$$

where n01 is the refractive index of a material of the grating part 144a at a wavelength λ0, d is the grating thickness of the grating part 144a, and m is the diffraction order.

The diffraction efficiency at an m-th order for another wavelength that does not satisfy equation (1) is represented by the following equation (2):

$$\eta m(\lambda) = [\sin\{\pi(\phi(\lambda)-m)\}/\{\pi(\phi(\lambda)-m)\}]^2 \tag{2}$$

where $\phi(\lambda)$ is given by:

$$\phi(\lambda)=\{n1(\lambda)-1\}d/\lambda$$

where $n1(\lambda)$ is the refractive index of the material of the grating 144 at a wavelength $\lambda$.

A layered diffractive optical element including two or more diffraction gratings exhibits the same basic behavior. In order that all layers function as a single diffraction grating, it is determined that the sum of the differences in the optical path length for all layers is an integral multiple of a wavelength, each difference being defined between a peak and a valley of a diffraction part formed on each boundary of the individual materials.

As a result, for the layered diffractive optical element 1 as shown in FIG. 2, a condition that the diffraction efficiency be largest at a design wavelength $\lambda 0$ in the case of a pencil of light incident perpendicular to the first envelope face 9 and the second envelope face 10 is represented by the following equation (3):

$$\pm(n01-1)d1\pm(n02-1)d2=m\lambda 0 \qquad (3)$$

where n01 is the refractive index of the material of the first grating part 6a of the first diffraction grating 6 at a wavelength $\lambda 0$, n02 is the refractive index of the material of the second grating part 7a of the second diffraction grating 7 at a wavelength $\lambda 0$, d1 is the grating thickness of the first grating part 6a of the first diffraction grating 6, and d2 is the grating thickness of the second grating part 7a of the second diffraction grating 7.

Assuming that the order of a light ray that diffracts in a direction lower than a light ray of a zeroth order shown in FIG. 2 is positive, the sign attached to the grating thickness of each layer in equation (3) is determined in the following manner: a grating that increases in thickness from the top to the bottom in FIG. 2 (the first diffraction grating 6) has a positive sign (i.e., 0<d1); in contrast, a grating that decreases in thickness from the top to the bottom in FIG. 2 (the second diffraction grating 7) has a negative sign (i.e., d2<0).

Therefore, equation (3) in the structure shown in FIG. 2 is represented by the following equation (4):

$$(n01-1)d1-(n02-1)d2=m\lambda 0 \qquad (4)$$

As in the case of the single-layer diffractive optical element, the diffraction efficiency for another wavelength that does not satisfy equation (3) is represented by the following equation (5):

$$\eta m(\lambda)=[\sin\{\pi(\phi(\lambda)-m)\}/\{\pi(\phi(\lambda)-m)\}]^2 \qquad (5)$$

where $\phi(\lambda)$ is given by:

$$\phi(\lambda)=[\{n1(\lambda)-1\}d1-\{n2(\lambda)-1\}d2]/\lambda$$

where $n1(\lambda)$ is the refractive index of the material of the first grating part 6a of the first diffraction grating 6 at a wavelength $\lambda$ and $n2(\lambda)$ is the refractive index of the material of the second grating part 7a of the second diffraction grating 7 at a wavelength $\lambda$.

By using specific examples, the details are described below.

The first diffraction grating 6 has the following structure. The first grating part 6a is made of an ultraviolet-curing resin RC-C001 (trade name) (nd=1.524, vd=50.8) available from Dainippon Ink and Chemicals, Inc. and has a grating thickness, d1, of about 7.5 μm.

Similarly, the second diffraction grating 7 has the following structure. The second grating part 7a is made of an ultraviolet-curing resin (nd=1.696, vd=17.7) and has a grating thickness, d2, of about 4.78 μm.

Figure 18:
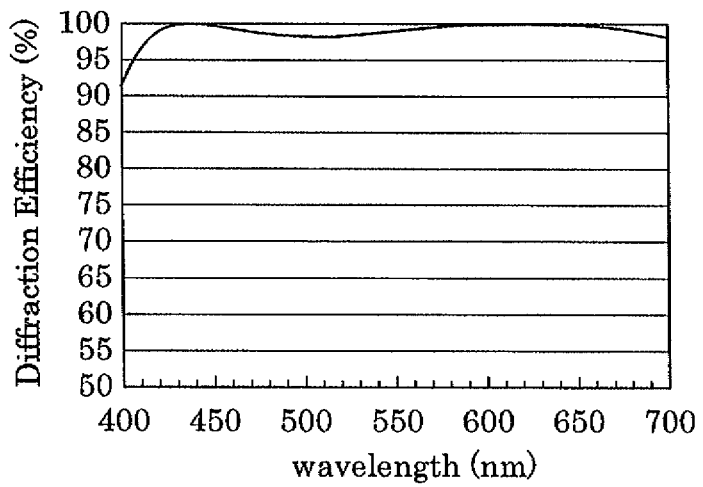
FIG. 18 is a graph of diffraction efficiency of another known multilayer diffractive optical element.
Figure 19:
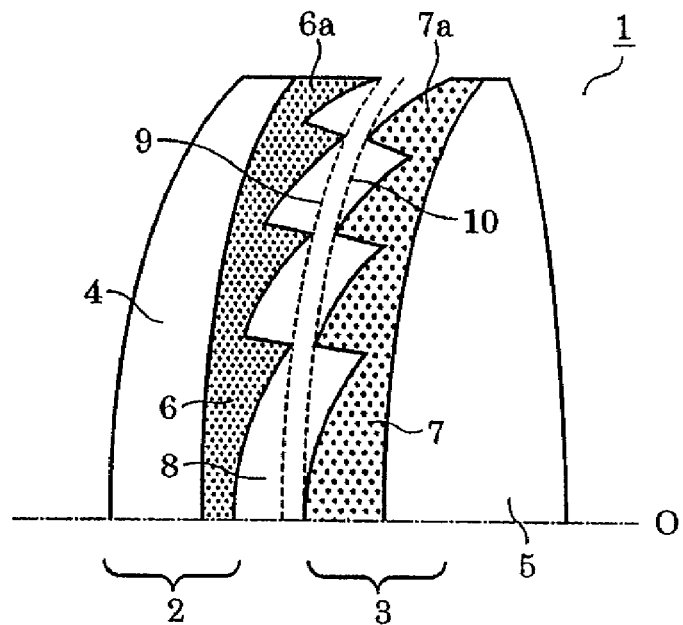
FIG. 19 is a cross-sectional view of another known multilayer diffractive optical element including a diffraction grating disposed on a curved face.
Figure 20:
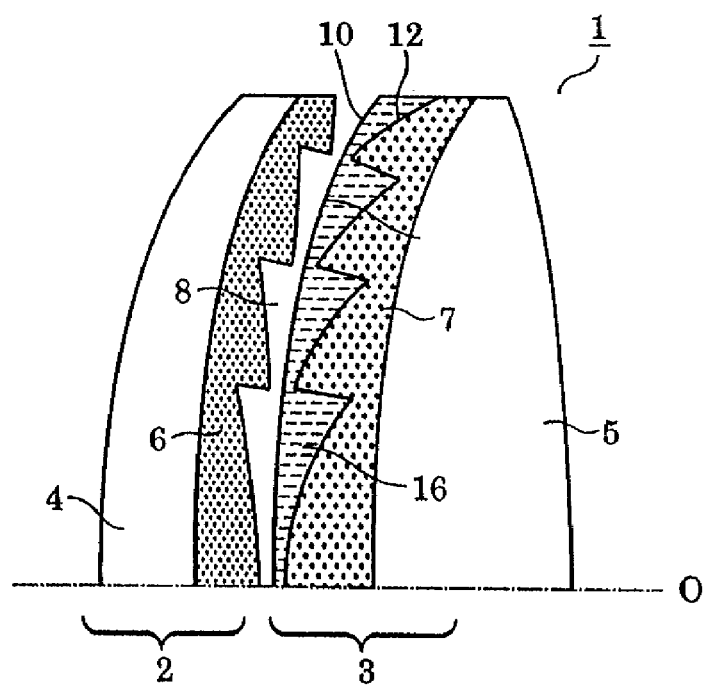
FIG. 20 is a cross-sectional view of another known multilayer diffractive optical element including a diffraction grating disposed on a curved face.

The grating heights (thicknesses) d1 and d2 described above are optimized for normal incidence shown in equations (4) and (5). FIG. 18 shows the diffraction efficiency of diffraction light of the first order in this structure. As is evident from FIG. 18, appropriately determining the material and grating height of each of the two diffraction gratings realizes a diffraction efficiency of 100% at a plurality of wavelengths (440 nm and 620 nm in FIG. 18) and also maintains high diffraction efficiency throughout the visible range. Each of the wavelengths having a diffraction efficiency of 100% satisfies equation (3). In other words, at a plurality of wavelengths, the maximum difference in the optical path length of light passing through a plurality of diffraction gratings (the maximum value of the difference in the optical path length between a peak and a valley of a diffraction part) is an integral multiple of a corresponding wavelength.

Next, a case in which a pencil of rays incident from a direction inclined at an angle of $\theta(\lambda)$ from the normal to the first envelope face 9 and second envelope face 10 enters the first diffraction grating 6 is described.

In this case, the diffraction efficiency is represented by the following equation (6):

$$\eta m(\lambda)=[\sin\{\pi(\phi(\lambda)-m)\}/\{\pi(\phi(\lambda)-m)\}]^2 \qquad (6)$$

where $\phi(\lambda)$ is given by:

$$\phi(\lambda)=[\{n1(\lambda)\cos\theta(\lambda)-\cos\theta a(\lambda)\}d1-\{n2(\lambda)\cos\theta 2(\lambda)-\cos\theta a(\lambda)\}d2]/\lambda$$

where $\theta 2(\lambda)$ is the diffraction angle of the m-th order in a pencil of rays leaving the second diffraction grating 7 at a wavelength $\lambda$ and $\theta a(\lambda)$ is the angle of a pencil of rays propagating through the air layer 8 disposed between the first diffraction grating 6 and the second diffraction grating 7 at a wavelength $\lambda$. The direction in which an incident pencil of rays at an angle of $\theta(\lambda)$ travels in a structure including only the first diffraction grating 6 is calculated by the following equation (7):

$$P\times(\sin\theta a(\lambda)-n1(\lambda)\sin\theta(\lambda))=ma\times\lambda \qquad (7)$$

where P is the grating pitch of the first grating part 6a of the first diffraction grating 6 projected in the tangential direction of the first envelope face 9 and ma is the diffraction order in the structure including only the first diffraction grating 6. In the structure including only the first diffraction grating 6, ma is an integer.

In the layered diffractive optical element according to this embodiment, ma is a real number.

This is because light waves diffracted by the first diffraction grating 6 interfere with each other, the light waves reach the second diffraction grating 7 before propagating in a diffraction order corresponding to the grating pitch of the first grating part 6a of the first diffraction grating 6, then the light waves interfere with each other in the second diffraction grating 7, and finally, the light waves leaving the second diffraction grating 7 propagate in a specific diffraction order.

Figure 4:
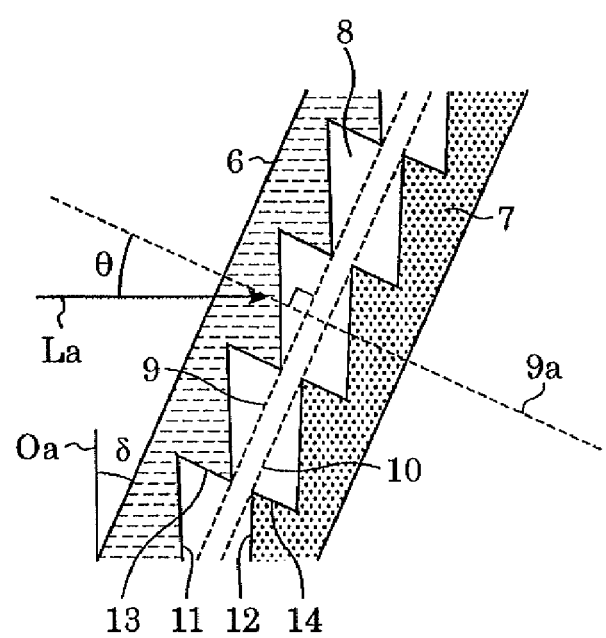
FIG. 4 is a schematic view of the diffraction parts of the diffractive optical element according to the first embodiment.
Figure 5:
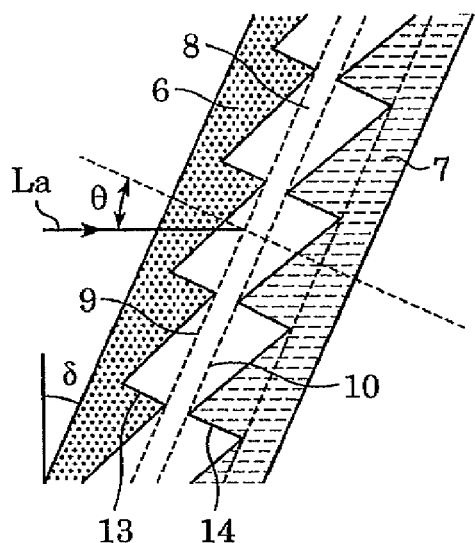
FIG. 5 is a schematic view of diffraction parts of a known multilayer diffractive optical element.

Next, a comparison between the diffraction efficiency of the diffractive optical element according to this embodiment and that of a known diffractive optical element is given. FIG. 4 schematically shows the diffractive optical element according to this embodiment, and FIG. 5 schematically shows a known diffractive optical element. In FIG. 4, a section of the diffraction part that is remote from the optical axis O and is adjacent to the periphery is shown. Since only the diffraction efficiency is explained, the first envelope face 9, the second envelope face 10, the first grating surface 11, and the second grating surface 12 are each represented as a plane in FIG. 4. The first envelope face 9 and the second envelope face 10 are inclined at a tilt angle δ corresponding to the tangent of the face from a plane Oa normal to the optical axis O. For normal incidence, the diffraction efficiency of the diffractive optical element is substantially the same between this embodiment and the known structure.

However, when the first envelope face 9 and the second envelope face 10 are inclined, the different order and orientation of gratings considerably change the characteristics.

Figure 6:
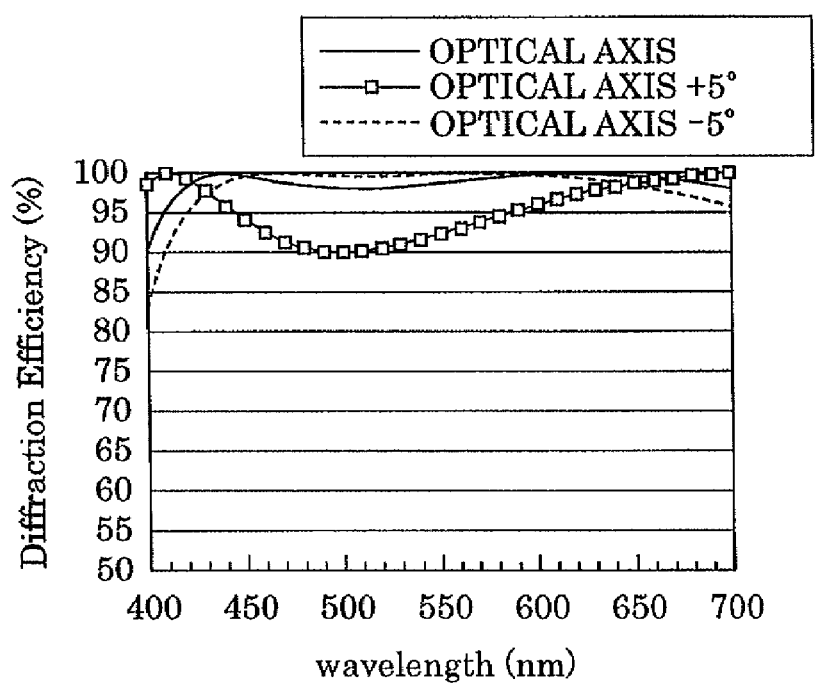
FIG. 6 is a graph of diffraction efficiency of the diffractive optical element according to the first embodiment.
Figure 7:
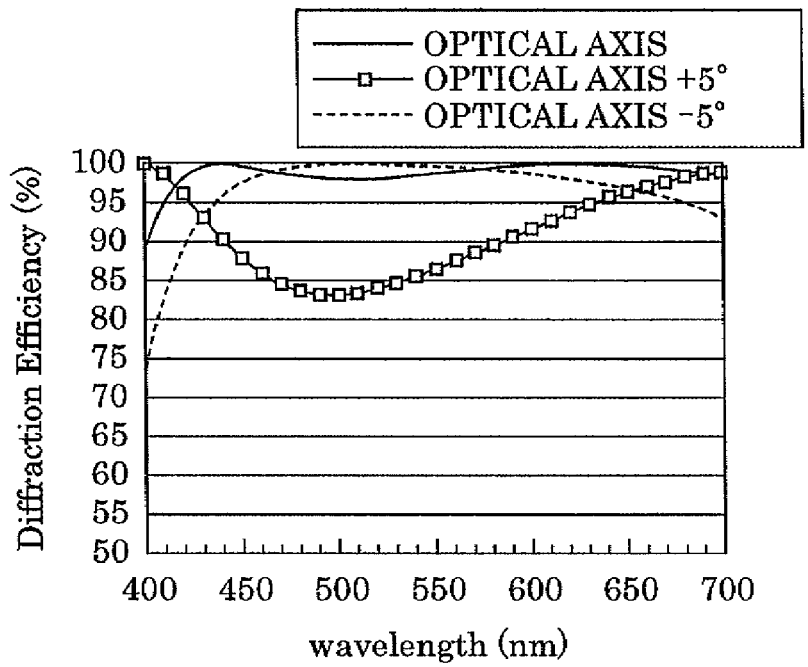
FIG. 7 is a graph of diffraction efficiency of the known multilayer diffractive optical element.

FIGS. 6 and 7 show the diffraction efficiency in the diffractive optical elements illustrated in FIGS. 4 and 5, respectively, in the case where a pencil of rays is incident from the direction of the optical axis O. In FIGS. 6 and 7, three lines indicate the diffraction efficiency for an incident ray along the optical axis O and that in the direction of the optical axis O±5°.

Since the material of the first grating part 6a of the first diffraction grating 6 is different between the diffractive optical element according to this embodiment, as shown in FIG. 6, and the known diffractive optical element, as shown in FIG. 7, the incident angle means the angle within the first substrate 4.

In addition, the grating height d1 of a grating (the first diffraction grating 6 in FIG. 2) of a diffraction lens having a positive optical power is changed from the grating height optimized for normal incidence previously described, so that the diffractive optical element is optimized for the diffraction efficiency of a pencil of rays incident from the direction of the optical axis O.

The details are described below using specific numeric values.

The tilt angle δ of the first envelope face 9 and the second envelope face 10 is about 15° and the grating pitch P of the first grating part 6a and the second grating part 7a is about 160 µm.

The first substrate 4 uses S-NBH51 (trade name) (nd=1.7495, vd=35.3) available from Ohara Inc. As with the case of the structure previously described, the first grating part 6a of the first diffraction grating 6 is made of an ultraviolet-curing resin RC-C001 (trade name) (nd=1.524, vd=50.8) available from Dainippon Ink and Chemicals, Inc., and the second grating part 7a of the second diffraction grating 7 is made of an ultraviolet-curing resin (nd=1.696, vd=17.7).

An incident pencil of rays La from the direction of the optical axis is equal to an incident ray inclined at an angle δ from a normal 9a, which is normal to the envelope face. If the grating height d is optimized for the diffraction efficiency of the incident pencil of rays La, which is incident from the direction of the optical axis, the first diffraction grating 6 has a positive optical power and the grating height d1 is about 7.441 µm, and the second diffraction grating 7 has a negative optical power and the grating height d2 is about 4.78 µm.

As shown in FIG. 6, which is a graph of the diffraction efficiency of the diffractive optical element according to this embodiment, the optimized diffraction efficiency for a pencil of rays incident from the direction of the optical axis, indicated by a solid line, realizes a performance equivalent to the diffraction efficiency optimized for a pencil of rays incident from the direction normal to the envelope face, as shown in FIG. 18.

Next, the known diffractive optical element shown in FIG. 5 is described. The tilt angle of each of the first envelope face 9 and the second envelope face 10 and the material of each of the first substrate 4 and the second substrate 5 are the same as those in the first embodiment. The materials of the first diffraction grating 6 and the second diffraction grating 7 are reversed, compared with those in the first embodiment. If the grating height d is optimized for the diffraction efficiency of the incident ray La from the direction of the optical axis, the first diffraction grating 6 has a negative optical power and the grating height d1 is about 4.78 µm, and the second diffraction grating 7 has a positive optical power and the grating height d2 is about 7.316 µm.

As shown in FIG. 7, which is a graph of the diffraction efficiency of the known diffractive optical element, the optimized diffraction efficiency for a ray incident from the direction of the optical axis, indicated by a solid line, also realizes a performance equivalent to the diffraction efficiency optimized for a ray incident from the direction normal to the envelope face, as shown in FIG. 18.

However, as is evident from FIGS. 6 and 7, the diffractive optical element according to the first embodiment has a significantly improved diffraction efficiency for a pencil of rays incident from the direction of the optical axis ±5° as compared with the known diffractive optical element. In the known diffractive optical element, the diffraction efficiency for a pencil of rays incident from the direction of the optical axis ±5° is much lower than that for a pencil of rays La incident from the direction of the optical axis, whereas in the diffractive optical element according to the first embodiment, the amount of change in the diffraction efficiency is reduced to about half of that in the known diffractive optical element.

The diffraction efficiency described above does not consider vignetting of a pencil of rays at the sides of the gratings. Only the change in the diffraction efficiency calculated by equations (6) and (7) is shown.

Next, the shape of the first grating side 13 and the second grating side 14 is described. In terms of the optical performance, it is necessary to minimize the vignetting of an incident pencil of rays caused by the first grating side 13 and the second grating side 14. Therefore, if the first grating side 13 and the second grating side 14 are disposed parallel to a ray corresponding to a barycenter of the distribution of incident angles of incident rays, the vignetting of an incident pencil of rays at the first grating side 13 and the second grating side 14 can be minimized. In the case where the ray corresponding to the barycenter of an incident pencil of rays is a ray incident from the direction of the optical axis, the optimal shape of each of the first grating side 13 and the second grating side 14 is a cylindrical surface parallel to the optical axis O shown in FIG. 2.

Next, the production of the diffractive optical element in the present invention is described. In terms of mass production, it is desirable that the diffractive optical element be produced by molding with a die in which the grating shape is formed. In this case, releasing a molded component from a die is required.

Figure 8:
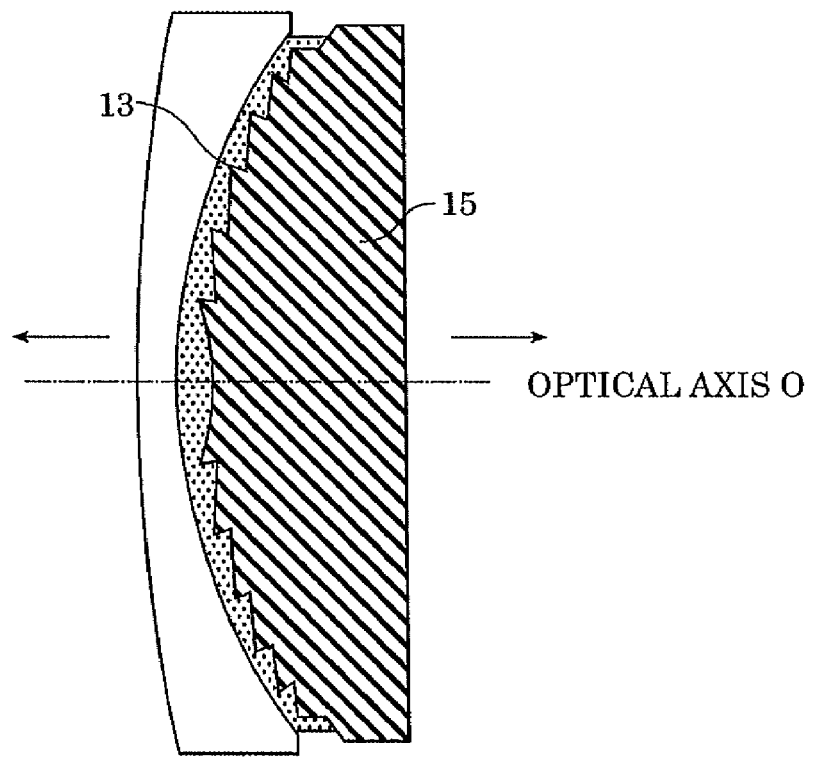
FIG. 8 is an illustration showing how the diffractive optical element according to the first embodiment is produced.

FIG. 8 shows an example of how the first diffraction grating 6 is released from a die. For example, the first grating side 13 made up of a plane parallel to the normal to the first envelope face 9, as shown in FIG. 4, is described as one example. In FIG. 8, in order to release the first diffraction grating 6 from a die (molding die) 15, the first diffraction grating 6 is to be separated from the die 15 in the direction of the optical axis O. In this case, since the first grating side 13 is perpendicular to the envelope face, the first grating side 13 is caught in the die 15.

Therefore, it is difficult to release the first grating side 13 of this shape in the direction of the optical axis O.

In contrast to this, when the first grating side 13 of the first diffraction grating 6 is made up of a plane parallel to the optical axis O, the first grating side 13 can be released from the die 15 in the optical axis O. In this case, an angle defined between the first grating side 13 and a normal defined between one of the grating tips and the envelope face 9 gradually increases as the distance from the optical axis increases.

In consideration of such optical performance and production requirements, the shape of the first grating side 13 is determined.

As described above, according to this embodiment of the present invention, in the case where the radius of curvature of each of the first envelope face 9 and the second envelope face 10 is small, the difference between the present invention and the known diffractive optical element is noticeable. In addition, in the case where a pencil of rays incident on the surface of the grating deviates from the normal of the first envelope face 9 and the second envelope face 10 to one side, the advantages are noticeable. Therefore, for applying a layered diffractive optical element according to this embodiment to an optical system, it is necessary to select an optimal face. For example, it is desirable that the diffractive optical power be applied to a face having a radius of curvature that is between one-fifteenth of the focal length of an optical system and one-half thereof, inclusive.

Figure 9:
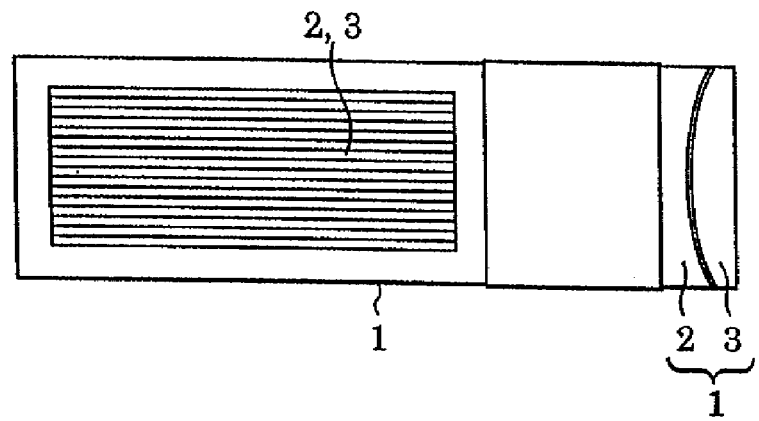
FIG. 9 is an illustration showing another application to which the diffractive optical element according to the first embodiment can be applied.

In the foregoing, the diffractive optical element has a spherical curved reference surface. The diffractive optical element may have a one-dimensional grating, as shown in FIG. 9, an aspherical curved reference surface, or may be applied to any surface, including a cylindrical surface and a toric surface.

The diffractive optical element according to this embodiment has a layered structure including a plurality of diffraction gratings, but the advantages of this embodiment are not limited to the layered diffractive optical element. Applying the present invention to a single-layer diffractive optical element including only a single diffraction grating achieves the same advantages.

According to the diffractive optical element described above, high diffraction efficiency is maintained even when diffraction gratings in a layered structure are formed on curved surfaces. Flare can be effectively suppressed even when the diffractive optical element is incorporated in an optical system.

In particular, the diffractive optical element according to this embodiment is effective for a layered diffractive optical element that is prone to have a larger thickness (a layered diffractive optical element including at least two diffraction gratings composed of materials having different dispersions). By using a diffraction grating in which an envelope face defined by connecting the grating tips and a grating face of a grating portion are both curved faces as at least one diffraction grating in a layered diffractive optical element, the advantages described above are noticeable.

Second Embodiment

In the first embodiment, the layered diffractive optical element has the two diffraction gratings disposed adjacent to each other with the air layer therebetween. The diffractive optical element in the present invention is not limited to this structure, and can be applied to a layered diffractive optical element 1 shown in FIG. 10.

Figure 10:
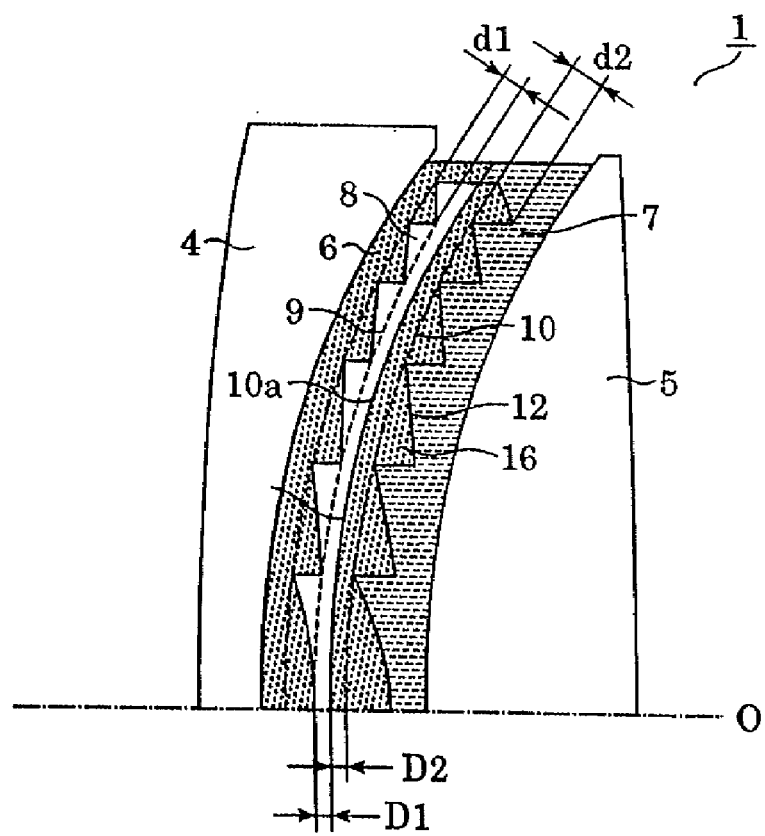
FIG. 10 is a cross-sectional view of a main portion of the diffractive optical element according to a second embodiment.

In the structure shown in FIG. 10, a second diffraction grating, as in the first embodiment, is disposed such that a second grating surface is disposed at the boundary of two different materials. A third diffraction grating 16 is disposed in a part of an air layer 8 in the second embodiment. Therefore, a face 10a opposite to a grating face of the third diffraction grating 16 is a curved face having a curvature substantially the same as each of the first envelope face 9 and the second envelope face 10.

In this case, a second grating surface 12 has a larger radius of curvature than that of the second envelope face 10, as with the case of the first embodiment.

Third Embodiment

In the first and second embodiments, the first diffraction grating 6 and the second diffraction grating 7 are adjacent to each other. This structure requires that the relative positions of the two diffraction gratings be accurately determined.

Figure 11:
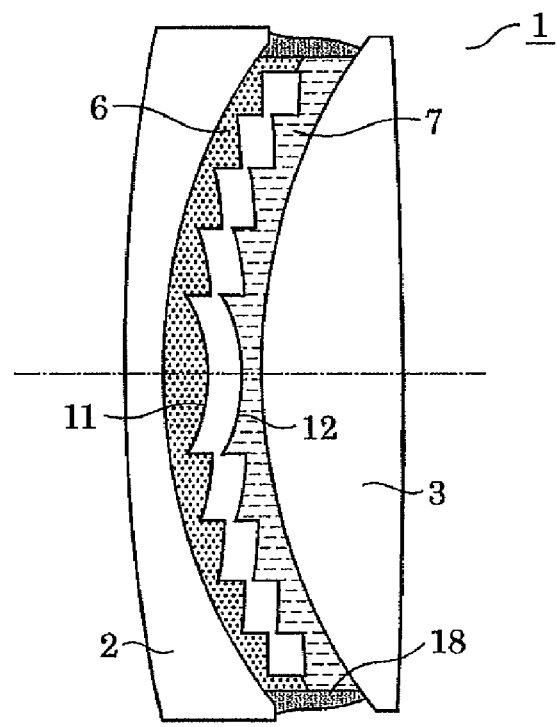
FIG. 11 is a cross-sectional view of a main portion of the diffractive optical element according to a third embodiment.

In a third embodiment, as shown in FIG. 11, a first diffraction grating 6 is bonded to a second diffraction grating 7 with a bonding layer 18 at a part where a grating part is not formed. If the assembly operation up to bonding is conducted in a clean room, adherence of dust particles to a first grating surface 11 and a second grating surface 12 is largely reduced.

In addition, after the first grating surface 11 and the second grating surface 12 are bonded together, an operator or the like does not touch the first grating surface 11 and the second grating surface 12. Therefore, the workability of incorporation of the diffractive optical element 1 into another optical system is greatly improved.

Fourth Embodiment

In the diffractive optical element according to the embodiments described above, the first substrate 4 and the first grating surface 11 are composed of different materials from each other. The present invention is not limited to this structure, however. The grating surface may be composed of the same material as that of the substrate and may be integrally formed with the substrate.

This structure allows precise positioning of the outside diameter of the substrate and the center of the grating. For a substrate having a lens shape, the center of the substrate lens and the center of the grating can be accurately positioned.

As a result, the accuracy of alignment of the optical axis when the diffractive optical element of the present invention is incorporated into another lens is improved, and therefore, aberration degradation, such as degradation of image-forming properties, resulting from decentering of the diffractive optical element is significantly reduced.

Fifth Embodiment

Figure 12:
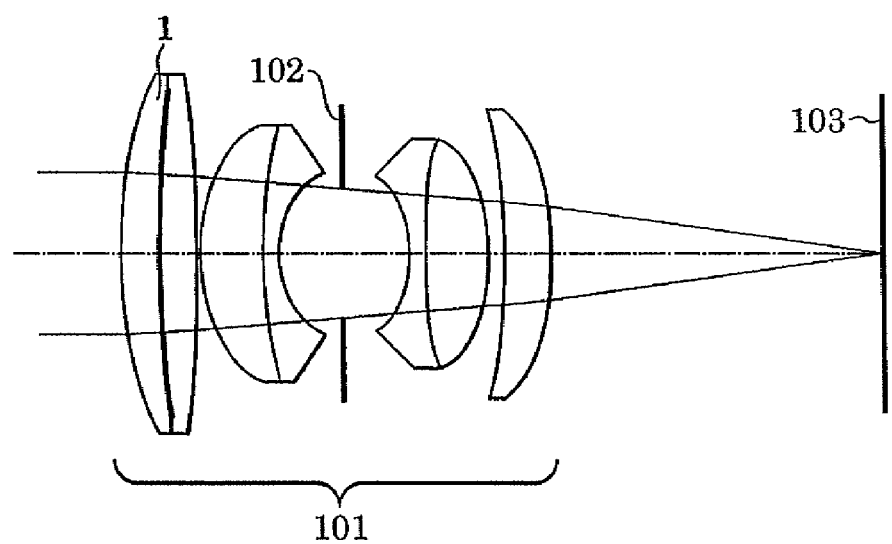
FIG. 12 is a cross-sectional view of a main portion of an optical system used to capture images according to a fifth embodiment.

FIG. 12 shows an optical system according to a fifth embodiment using the diffractive optical element of the present invention, and illustrates a cross-section of an optical system used to capture images. Examples of such an image-capturing optical system include a digital camera and a film camera. In FIG. 12, the optical system includes an image-capturing lens 101 including an aperture 102 and the diffractive optical element 1 of the present invention. The optical system also includes a film 103 or a charge-coupled device (CCD) 103 serving as an imaging surface.

The use of the diffractive optical element of the present invention significantly improves the dependence of the diffraction efficiency on wavelength, and therefore, a high-performance image-capturing lens causing less flare and achieving a high resolution at low frequencies is realized.

The diffractive optical element of the present invention can be produced by a simple manufacturing process, and as a result, an inexpensive image-capturing optical system with excellent manufacturability can be provided.

In FIG. 12, the diffractive optical element of the present invention is disposed on a face to which front lens elements are bonded. The present invention is not limited to this structure, however. The diffractive optical element may be disposed on a surface of a lens. Alternatively, a plurality of diffractive optical elements may be used.

In this embodiment, the diffractive optical element is used in an image-capturing lens of a camera or the like. The present invention is not limited to this structure, however. The diffractive optical element employed in an image-forming optical system used in a wide wavelength range can realize the same advantages. Examples of such an image-forming optical system include an image-capturing lens of a video camera, an image scanner, and a reader lens of a digital copier.

Sixth Embodiment

Figure 13:
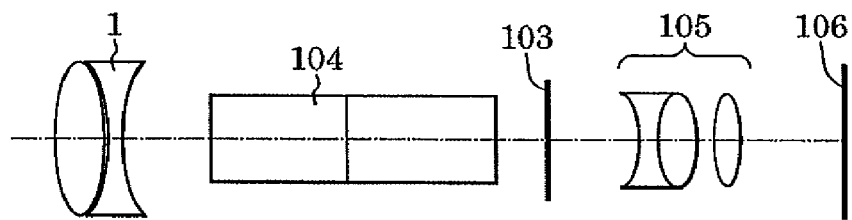
FIG. 13 is a cross-sectional view of a main portion of an optical system used for observation according to a sixth embodiment.

FIG. 13 shows an optical system according to a sixth embodiment using the diffractive optical element of the present invention and illustrates a cross-section of an optical system used for observation, such as binoculars. In FIG. 13, the optical system includes an objective lens 1 serving as a diffractive optical element, a prism 104 for erecting an image, an eyepiece 105, and an evaluation surface (pupil surface) 106.

In FIG. 13, the objective lens 1 uses the diffractive optical element of the present invention. The objective lens (diffractive optical element) 1 is used for correcting chromatic aberration or the like on an image-forming face for an objective lens system.

The use of the diffractive optical element of the present invention significantly improves the dependence of the diffraction efficiency on wavelength, and therefore, a high-performance objective lens causing less flare and achieving a high resolution at low frequencies is realized. In addition, the diffractive optical element of the present invention can be produced by a simple manufacturing process, and thus an inexpensive image-capturing optical system with excellent manufacturability can be provided.

In this embodiment, the objective lens uses the diffractive optical element. The present invention is not limited to this structure, however. The diffractive optical element used in a prism surface or within an eyepiece can realize the same advantages. However, since arranging the diffractive optical element at a side adjacent to an object relative to the image-forming face reduces chromatic aberration of only the objective lens, in an ocular observation system, it is desired that the diffractive optical element be disposed at least at a side adjacent to the objective lens.

In this embodiment, the optical system is the binoculars. The present invention is not limited to this structure, however. The optical system may be a terrestrial telescope, an astronomical telescope, or an optical viewfinder, such as a lens-shutter camera or a video camera.

As described above, in each of the embodiments, the diffractive optical element is used in a wide wavelength range, has a layered structure in which at least two diffraction gratings composed of at least two materials having different dispersions are disposed adjacent to one another, and has high diffraction efficiency at a specific order (design order) throughout a used wavelength range. In the case where an envelope face connecting the grating tips of each of the diffraction gratings is a curved face, the diffractive optical element has a grating face with a larger radius of curvature than that of the envelope face.

Therefore, even if the diffraction grating is disposed on a curved face having a small radius of curvature, a diffractive optical element suppressing the reduction in the diffraction efficiency is provided.

According to one aspect, the two diffraction gratings are bonded together at an area where grating parts are not formed in both the diffraction gratings. This structure significantly improves the ease of handling of the diffractive optical element and reduces adherence of dust particles to the diffractive optical element.

According to one aspect, the diffractive optical element includes at least one diffraction grating and has high diffraction efficiency at a specific order (design order) in a used wavelength range. In the case where the envelope face connecting the grating tips of the diffraction grating is a curved face, the diffractive optical element has a grating face with a larger radius of curvature than that of the envelope face.

Therefore, even if the diffraction grating is disposed on a curved face having a small radius of curvature, a diffractive optical element suppressing the reduction in the diffraction efficiency is provided.

According to one aspect, the substrate and the grating part of the diffraction grating are composed of the same material and they are integrally formed. Therefore, positioning of the outer diameter of the substrate and the center of the grating and, in the case of the substrate being a lens, alignment of the center of the substrate lens and the center of the grating, can be performed with high precision. As a consequence, degradation of image-forming performance resulting from decentering is significantly reduced, thus realizing a high-performance lens system.

In addition, for the diffractive optical element used in an image-capturing lens, an inexpensive image-capturing lens with high precision is realized. For the diffractive optical element used in an observing optical system, an inexpensive observing optical system with high precision is achieved.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical system comprising:
   a diffractive optical element including a plurality of diffraction gratings laminated and being composed of at least two materials having different dispersions,
      wherein at least one of the diffraction gratings includes a plurality of grating parts having a curved grating surface and grating tips which connect to define a curved envelope face,
      wherein the grating surface has a radius of curvature larger than a radius of curvature of the envelope face;
   a refractive optical element, and
      wherein an absolute value of the radius of curvature of the envelope face is between one-fifteenth of a focal length of the optical system to one-half of the focal length of the optical system, inclusive.

* * * * *